US012612106B2

(12) United States Patent
Iitaka et al.

(10) Patent No.: US 12,612,106 B2
(45) Date of Patent: Apr. 28, 2026

(54) DRIVING ASSISTANCE SYSTEM, DRIVING ASSISTANCE METHOD, AND RECORDING MEDIUM

(71) Applicant: HONDA MOTOR CO., LTD., Tokyo (JP)

(72) Inventors: Ryo Iitaka, Wako (JP); Naotoshi Fujimoto, Wako (JP); Tetsuya Kawahara, Wako (JP); Keisuke Osakabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 72 days.

(21) Appl. No.: 18/443,467

(22) Filed: Feb. 16, 2024

(65) Prior Publication Data

US 2024/0286678 A1 Aug. 29, 2024

(30) Foreign Application Priority Data

Feb. 24, 2023 (JP) ................................. 2023-026931

(51) Int. Cl.
| | |
|---|---|
| *B62D 15/02* | (2006.01) |
| *B60R 1/24* | (2022.01) |
| *B60R 1/26* | (2022.01) |
| *G06V 20/56* | (2022.01) |

(52) U.S. Cl.
CPC .............. *B62D 15/029* (2013.01); *B60R 1/24* (2022.01); *B60R 1/26* (2022.01); *B62D 15/025* (2013.01); *G06V 20/588* (2022.01); *B60R 2300/105* (2013.01); *B60R 2300/804* (2013.01)

(58) Field of Classification Search
CPC ...... B62D 15/029; B62D 15/025; B60R 1/24; B60R 1/26; B60R 2300/105; B60R 2300/804; G06V 20/588

USPC ........................................................... 701/41
See application file for complete search history.

(56) References Cited

U.S. PATENT DOCUMENTS

| | | | | |
|---|---|---|---|---|
| 9,090,263 B2 * | 7/2015 | Zeng | ...................... | B60W 40/06 |
| 2004/0164851 A1 * | 8/2004 | Crawshaw | ............. | B60Q 9/008 |
| | | | | 340/435 |
| 2007/0091173 A1 * | 4/2007 | Kade | .................... | G05D 1/0246 |
| | | | | 348/119 |
| 2012/0057757 A1 * | 3/2012 | Oyama | ................ | G06V 20/588 |
| | | | | 382/104 |
| 2012/0314055 A1 * | 12/2012 | Kataoka | ................. | G08G 1/167 |
| | | | | 382/104 |

(Continued)

FOREIGN PATENT DOCUMENTS

| | | | | | |
|---|---|---|---|---|---|
| JP | 2005178704 A | * | 7/2005 | ............... | B60R 1/00 |
| JP | 2018169319 A | * | 11/2018 | ............ | B60W 30/12 |

*Primary Examiner* — Long T Tran
*Assistant Examiner* — Anthony Donald Taylor, Jr.
(74) *Attorney, Agent, or Firm* — Rankin, Hill & Clark LLP

(57) ABSTRACT

A driving assistance system includes a frontward lane edge part estimation unit that, when it is difficult for a frontward lane edge part recognition unit to recognize a position, with respect to a vehicle, of a lane edge part of an own lane ahead of the vehicle, estimates the position, with respect to the vehicle, of the lane edge part of the own lane ahead of the vehicle, based on a shape of a target road recognized from map information and a current position of the vehicle, and based on a position, with respect to the vehicle, of a lane edge part of the own lane behind the vehicle recognized by a rearward lane edge part recognition unit.

4 Claims, 6 Drawing Sheets

(56)          References Cited

U.S. PATENT DOCUMENTS

2013/0211720 A1 *   8/2013   Niemz ................. B62D 15/025
                                                        701/538
2018/0150700 A1 *   5/2018   Kaneko ................. B60W 30/12
2020/0064855 A1 *   2/2020   Ji ......................... G05D 1/0246
2020/0117921 A1 *   4/2020   Okada .................. G06V 20/588
2023/0018786 A1 *   1/2023   Kim ...................... B60W 10/18
2023/0029533 A1 *   2/2023   Kim ...................... B60W 50/14
2024/0005673 A1 *   1/2024   Kagimoto .............. G08G 1/167

* cited by examiner

DRIVING ASSISTANCE SYSTEM, DRIVING ASSISTANCE METHOD, AND RECORDING MEDIUM

INCORPORATION BY REFERENCE

The present application claims priority under 35 U.S.C. § 119 to Japanese Patent Application No. 2023-026931 filed on Feb. 24, 2023. The content of the application is incorporated herein by reference in its entirety.

BACKGROUND OF THE INVENTION

Field of the Invention

The present invention relates to a driving assistance system, a driving assistance method, and a recording medium.

Description of the Related Art

In recent years, initiatives have intensified to provide access to sustainable transport systems giving consideration also to people, which are in a vulnerable position among traffic participants. To this end, efforts have been focused on research and development that further improves traffic safety and convenience through research and development related to driving assistance technologies. For example, Japanese Patent Laid-Open No. 2005-178704 discloses a technology in which a target amount of a state of a vehicle is set based on a road shape in a vehicle traveling direction, which is detected by a navigation device, and on a steering state and a traveling state of the vehicle. Japanese Patent Laid-Open No. 2018-169319 discloses a technology in which a virtual own-vehicle position is set by moving position information on an own-vehicle, which is detected by a navigation device, to a center in lane width of a travel lane, which is recognized by using a camera, and it is determined whether or not the own vehicle is in the travel lane, through comparison using a lap rate between an error range, which is set centered on the virtual own-vehicle position, and the lane width of the travel lane.

Incidentally, in the driving assistance technologies, it is necessary to recognize a situation of a lane ahead of the own vehicle in order to control operation of the vehicle. Depending on an environment in which the vehicle is traveling, for example, in a case where the angle of incidence of sunlight is low (at the time of traveling during hours of morning sunlight or afternoon sunlight, or the like), when the level of incident sunlight exceeds the dynamic range of a front camera, halation is caused, so that it is difficult to recognize a situation of a lane ahead. Accordingly, a challenge for the present application is to perform driving assistance that supports such a travel environment.

To address the challenge, an object of the present application is to provide a driving assistance system, a driving assistance method, and a program that can perform vehicle driving assistance in a situation where it is difficult to recognize a lane marking ahead of a vehicle. By extension, contributions toward development of sustainable transport systems will be made.

SUMMARY OF THE INVENTION

A first aspect to achieve the object is a driving assistance system including: a vehicle surroundings image acquisition unit that acquires a frontward image ahead of and a rearward image behind a vehicle, each of the frontward image and the rearward image being captured by a camera included in the vehicle; a frontward lane edge part recognition unit that, based on the frontward image, recognizes a position, with respect to the vehicle, of a lane edge part of an own lane ahead of the vehicle, the own lane being a lane in which the vehicle is traveling; a rearward lane edge part recognition unit that, based on the rearward image, recognizes a position, with respect to the vehicle, of a lane edge part of the own lane behind the vehicle; a vehicle position recognition unit that recognizes a current position of the vehicle; a map information acquisition unit that acquires map information including information on a target road on which the vehicle is traveling; and a frontward lane edge part estimation unit that, when it is difficult for the frontward lane edge part recognition unit to recognize the position, with respect to the vehicle, of the lane edge part of the own lane ahead of the vehicle, estimates the position, with respect to the vehicle, of the lane edge part of the own lane ahead of the vehicle, based on a shape of the target road ahead of the vehicle, and based on the position, with respect to the vehicle, of the lane edge part of the own lane behind the vehicle recognized by the rearward lane edge part recognition unit, the shape of the target road being recognized from the map information and the current position of the vehicle.

The driving assistance system may be configured to further include a lane keeping assist control unit that causes a steering device included in the vehicle to operate in such a manner that the vehicle travels on a center part in width direction of the own lane, based on the position, with respect to the vehicle, of the lane edge part of the own lane ahead of the vehicle recognized by the frontward lane edge part recognition unit, or based on the position, with respect to the vehicle, of the lane edge part of the own lane ahead of the vehicle estimated by the frontward lane edge part estimation unit.

The driving assistance system may be configured to further include a lane viewing assist control unit that causes a display device included in the vehicle to display an informing image showing the position of the lane edge part of the own lane ahead of the vehicle, based on the position, with respect to the vehicle, of the lane edge part of the own lane ahead of the vehicle recognized by the frontward lane edge part recognition unit, or based on the position, with respect to the vehicle, of the lane edge part of the own lane ahead of the vehicle estimated by the frontward lane edge part estimation unit.

A second aspect to achieve the object is a driving assistance method executed by a computer, the driving assistance method including: a vehicle surroundings image acquisition step of acquiring a frontward image ahead of and a rearward image behind a vehicle, each of the frontward image and the rearward image being captured by a camera included in the vehicle; a frontward lane edge part recognition step of, based on the frontward image, recognizing a position, with respect to the vehicle, of a lane edge part of an own lane ahead of the vehicle, the own lane being a lane in which the vehicle is traveling; a rearward lane edge part recognition step of, based on the rearward image, recognizing a position, with respect to the vehicle, of a lane edge part of the own lane behind the vehicle; a vehicle position recognition step of recognizing a current position of the vehicle; a map information acquisition step of acquiring map information including information on a target road on which the vehicle is traveling; and a frontward lane edge part estimation step of, when it is difficult in the frontward lane edge part recognition step to recognize the position, with respect to the vehicle, of the lane edge part of the own lane ahead of the vehicle, estimating the position, with respect to the vehicle, of the lane edge part of the own lane ahead of the vehicle, based on a shape of the target road ahead of the vehicle, and based on the position, with respect to the vehicle, of the lane edge part of the own lane behind the vehicle recognized in the rearward lane edge part recognition step, the shape of the target road being recognized from the map information and the current position of the vehicle.

A third aspect to achieve the object is a non-transitory recording medium storing a program that causes a computer to function as: a vehicle surroundings image acquisition unit that acquires a frontward image ahead of and a rearward image behind a vehicle, each of the frontward image and the rearward image being captured by a camera included in the vehicle; a frontward lane edge part recognition unit that, based on the frontward image, recognizes a position, with respect to the vehicle, of a lane edge part of an own lane ahead of the vehicle, the own lane being a lane in which the vehicle is traveling; a rearward lane edge part recognition unit that, based on the rearward image, recognizes a position, with respect to the vehicle, of a lane edge part of the own lane behind the vehicle; a vehicle position recognition unit that recognizes a current position of the vehicle; a map information acquisition unit that acquires map information including information on a target road on which the vehicle is traveling; and a frontward lane edge part estimation unit that, when it is difficult for the frontward lane edge part recognition unit to recognize the position, with respect to the vehicle, of the lane edge part of the own lane ahead of the vehicle, estimates the position, with respect to the vehicle, of the lane edge part of the own lane ahead of the vehicle, based on a shape of the target road ahead of the vehicle, and based on the position, with respect to the vehicle, of the lane edge part of the own lane behind the vehicle recognized by the rearward lane edge part recognition unit, the shape of the target road being recognized from the map information and the current position of the vehicle.

According to the driving assistance system, it is possible to assist in driving a vehicle in a situation where it is difficult to recognize a lane edge part ahead of the vehicle.

DETAILED DESCRIPTION OF THE PREFERRED EMBODIMENTS

1. Configurations of Vehicle and Driving Assistance System

Configurations of a driving assistance system 10 and a vehicle 1 equipped with the driving assistance system 10 according to the present disclosure are described with reference to FIGS. 1 to 3.

Figure 1:
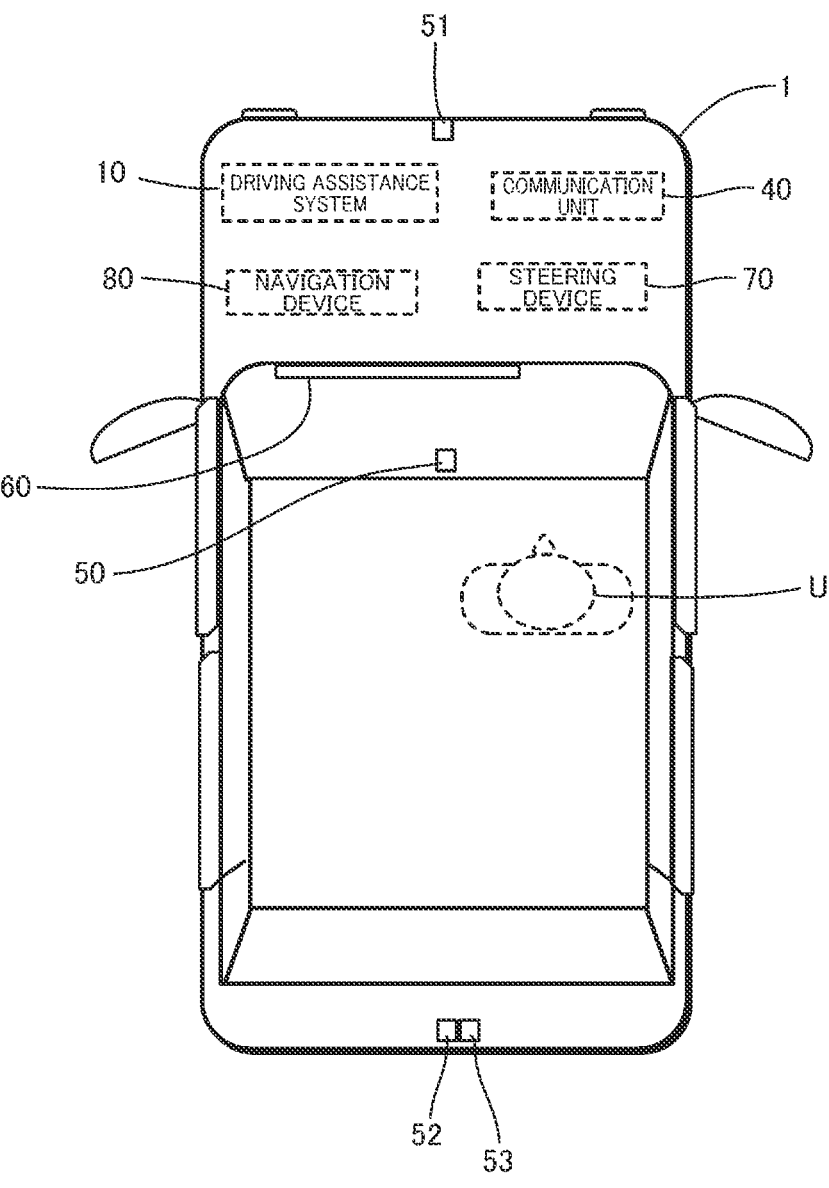
FIG. 1 is a configuration diagram of a vehicle equipped with a driving assistance system.

Referring to FIG. 1, the vehicle 1 equipped with the driving assistance system 10 according to the present disclosure includes a communication unit 40, a steering device 70, and a navigation device 80. The vehicle 1 further includes a front camera 50 capturing an image ahead of the vehicle, a front radar 51 detecting a position of an object ahead, a rear camera 52 capturing an image behind the vehicle, a rear radar 53 detecting a position of an object behind, and a display device 60 that is viewed by a user U (driver) with eyes. The display device 60 is, for example, a flat-panel display such as a liquid crystal display or an organic electroluminescent display. The display device 60 may be a HUD (Head-Up Display).

Figure 2:
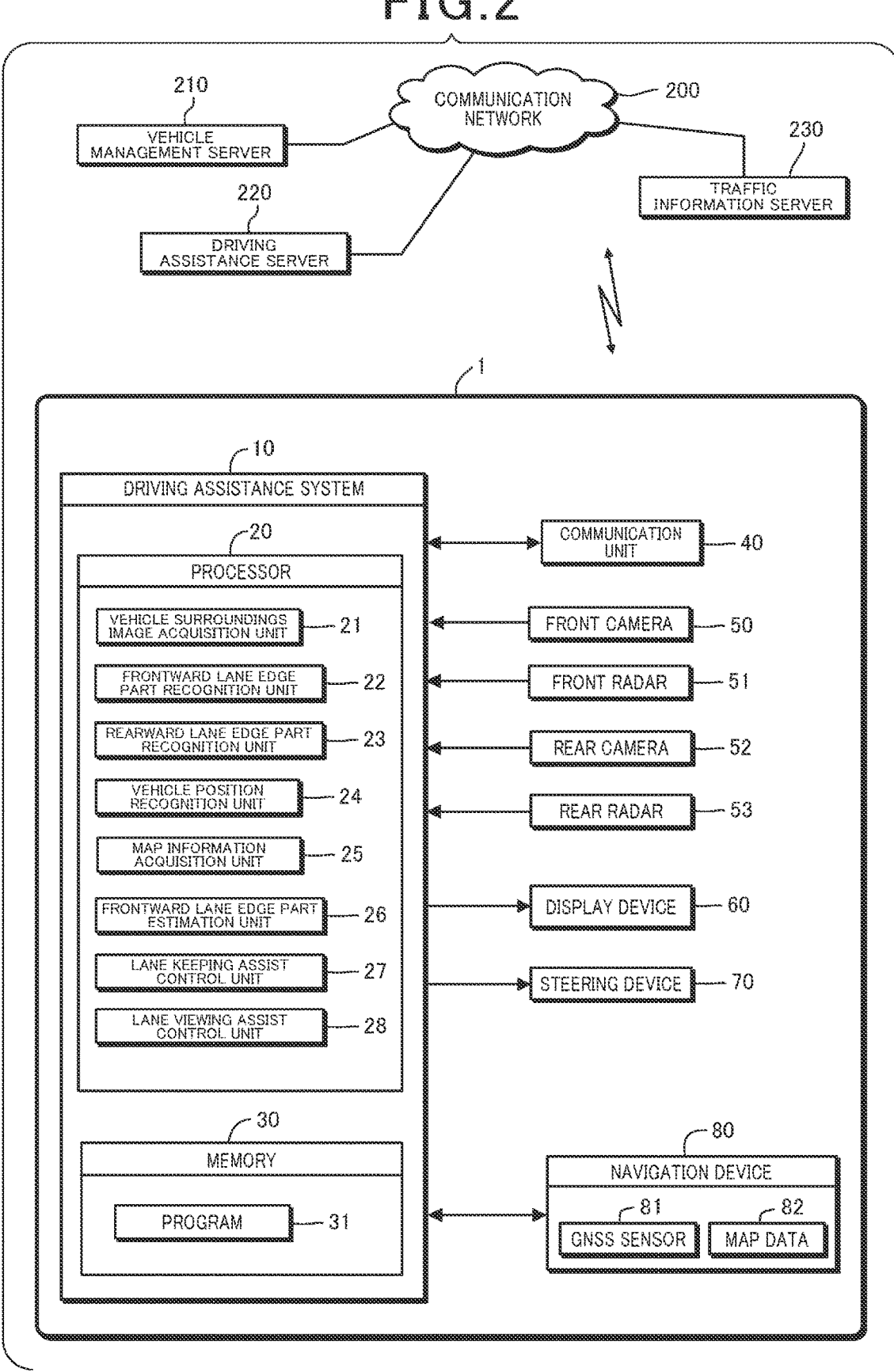
FIG. 2 is a configuration diagram of the driving assistance system.

Referring to FIG. 2, the driving assistance system 10 is connected to the communication unit 40, the front camera 50, the front radar 51, the rear camera 52, the rear radar 53, the display device 60, the steering device 70, and the navigation device 80. The navigation device 80 includes a GNSS (Global Navigation Satellite System) sensor 81 detecting a current position of the vehicle 1, and map data 82.

The driving assistance system 10, via the communication unit 40, communicates with external communication devices, such as a vehicle management server 210, a driving assistance server 220, and a traffic information server 230, through a communication network 200. Various data is inputted into the driving assistance system 10, including a frontward image captured by the front camera 50, position data on an object ahead detected by the front radar 51, a rearward image captured by the rear camera 52, position data on an object behind detected by the rear radar 53, current position data on the vehicle 1 detected by the GNSS sensor 81, route guidance data from the navigation device 80, and the like. Moreover, based on control signals outputted from the driving assistance system 10, information displayed by the display device 60, operation of the steering device 70, operation of the navigation device 80, and the like are controlled.

The driving assistance system 10 is a control unit including a processor 20 and a memory 30. The processor 20 may be a single processor or may be a multi-processor. A program 31 for control of the driving assistance system 10 is stored in the memory 30. The program 31 may be read from a recording medium (magnetic disk, optical disk, flash memory, or the like) and stored in the memory 30, or may be downloaded from the vehicle management server 210 or the like and stored in the memory 30.

The processor 20, by reading and executing the program 31, functions as a vehicle surroundings image acquisition unit 21, a frontward lane edge part recognition unit 22, a rearward lane edge part recognition unit 23, a vehicle position recognition unit 24, a map information acquisition unit 25, a frontward lane edge part estimation unit 26, a lane keeping assist control unit 27, and a lane viewing assist control unit 28.

A process executed by the vehicle surroundings image acquisition unit 21 corresponds to a vehicle surroundings image acquisition step in a driving assistance method of the present disclosure, and a process executed by the frontward lane edge part recognition unit 22 corresponds to a frontward lane edge part recognition step in the driving assistance method of the present disclosure. A process executed by the rearward lane edge part recognition unit 23 corresponds to a rearward lane edge part recognition step in the driving assistance method of the present disclosure, and a process executed by the vehicle position recognition unit 24 corresponds to a vehicle position recognition step in the driving assistance method of the present disclosure. A process executed by the map information acquisition unit 25 corresponds to a map information acquisition step in the driving assistance method of the present disclosure, and a process executed by the frontward lane edge part estimation unit 26 corresponds to a frontward lane edge part estimation step in the driving assistance method of the present disclosure.

Figure 3:
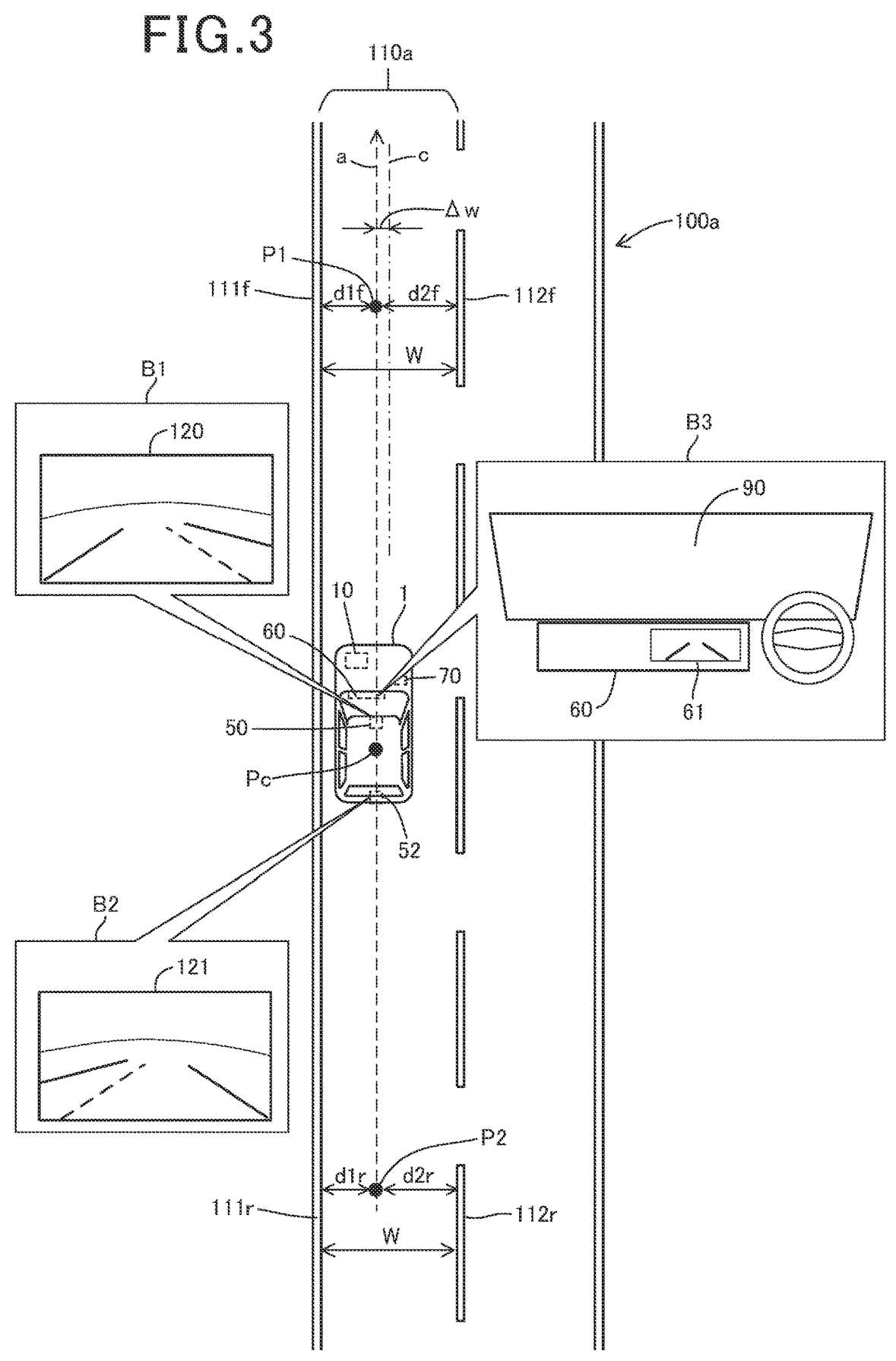
FIG. 3 is an explanatory diagram of lane keeping assist control and lane viewing assist control by the driving assistance system.

Here, FIG. 3 illustrates a situation in which the vehicle 1 is traveling a road 100*a*, and the vehicle 1 is traveling in a lane 110*a* (hereinafter, referred to as the own lane 110*a*). The vehicle surroundings image acquisition unit 21 acquires an image (frontward image) 120 ahead of the vehicle 1, which is captured by the front camera 50, and an image (rearward image) 121 behind the vehicle 1, which is captured by the rear camera 52, as shown in callouts B1, B2.

The frontward lane edge part recognition unit 22 performs various image processing, such as edge point extraction, feature amount extraction, and thinning, on the frontward image 120 and extracts image parts of a left-side lane marking 111*f* and a right-side lane marking 112*f* of the own lane 110*a* ahead of the vehicle 1. The frontward lane edge part recognition unit 22 then recognizes positions of the lane markings 111*f*, 112*f* with respect to the vehicle 1, based on position detection data from the front camera 50. More specifically, the frontward lane edge part recognition unit 22 recognizes respective distances d1*f*, d2*f* between the vehicle 1 and the lane markings 111*f*, 112*f* in width direction W of the own lane 110*a*. FIG. 3 shows an example in which the distances between the vehicle 1 and the lane markings 111*f*, 112*f* at a position P1 ahead of the vehicle 1 are d1*f*, d2*f*, respectively.

Similarly, the rearward lane edge part recognition unit 23 performs various image processing on the rearward image 121, and extracts image parts of a left-side lane marking 111*r* and a right-side lane marking 112*r* of the own lane 110*a* behind the vehicle 1. The rearward lane edge part recognition unit 23 then recognizes positions of the lane markings 111*r*, 112*r* with respect to the vehicle 1, based on position detection data from the rear camera 52. More specifically, the rearward lane edge part recognition unit 23 recognizes respective distances d1*r*, d2*r* between the vehicle 1 and the lane markings 111*r*, 112*r* in the width direction W of the own lane 110*a*. FIG. 3 shows an example in which the distances between the vehicle 1 and the lane markings 111*r*, 112*r* at a position P2 behind the vehicle 1 are d1*r*, d2*r*, respectively.

The vehicle position recognition unit 24 recognizes a current position Pc of the vehicle 1, based on position detection data obtained by the GNSS sensor 81. The map information acquisition unit 25 acquires, by extracting from the map data 82, map information including information on the road on which the vehicle 1 is traveling, according to the current position of the vehicle 1. The map information is high-precision information including road shapes (straight roadway, curved roadway, and the like). The map information may be acquired by being received from the traffic information server 230 or the like through the communication network 200.

The frontward lane edge part estimation unit 26 estimates positions of the lane markings 111*f*, 112*f*, based on first to third elements listed below, in order to respond in the event that it is difficult for the frontward lane edge part recognition unit 22 to recognize the lane markings 111*f*, 112*f* of the own lane 110*a* ahead based on the frontward image 120. The event that it is difficult for the frontward lane edge part recognition unit 22 to recognize the lane markings 111*f*, 112*f* of the own lane 110*a* ahead based on the frontward image 120 is, for example, a case in which the image parts of the lane markings 111*f*, 112*f* cannot be extracted due to halation caused by sunlight with an intensity exceeding the dynamic range of the front camera 50 in a situation where the angle of incidence of sunlight ahead of the vehicle 1 is low (during hours of morning sunlight, afternoon sunlight, or the like).

First element: Current position of the vehicle 1, recognized by the vehicle position recognition unit 24.

Second element: Shape of the road ahead of the vehicle 1, recognized from the map information acquired by the map information acquisition unit 25.

Third element: Positions of the lane markings of the own lane behind with respect to the vehicle 1, recognized by the rearward lane edge part recognition unit 23.

Figure 4:
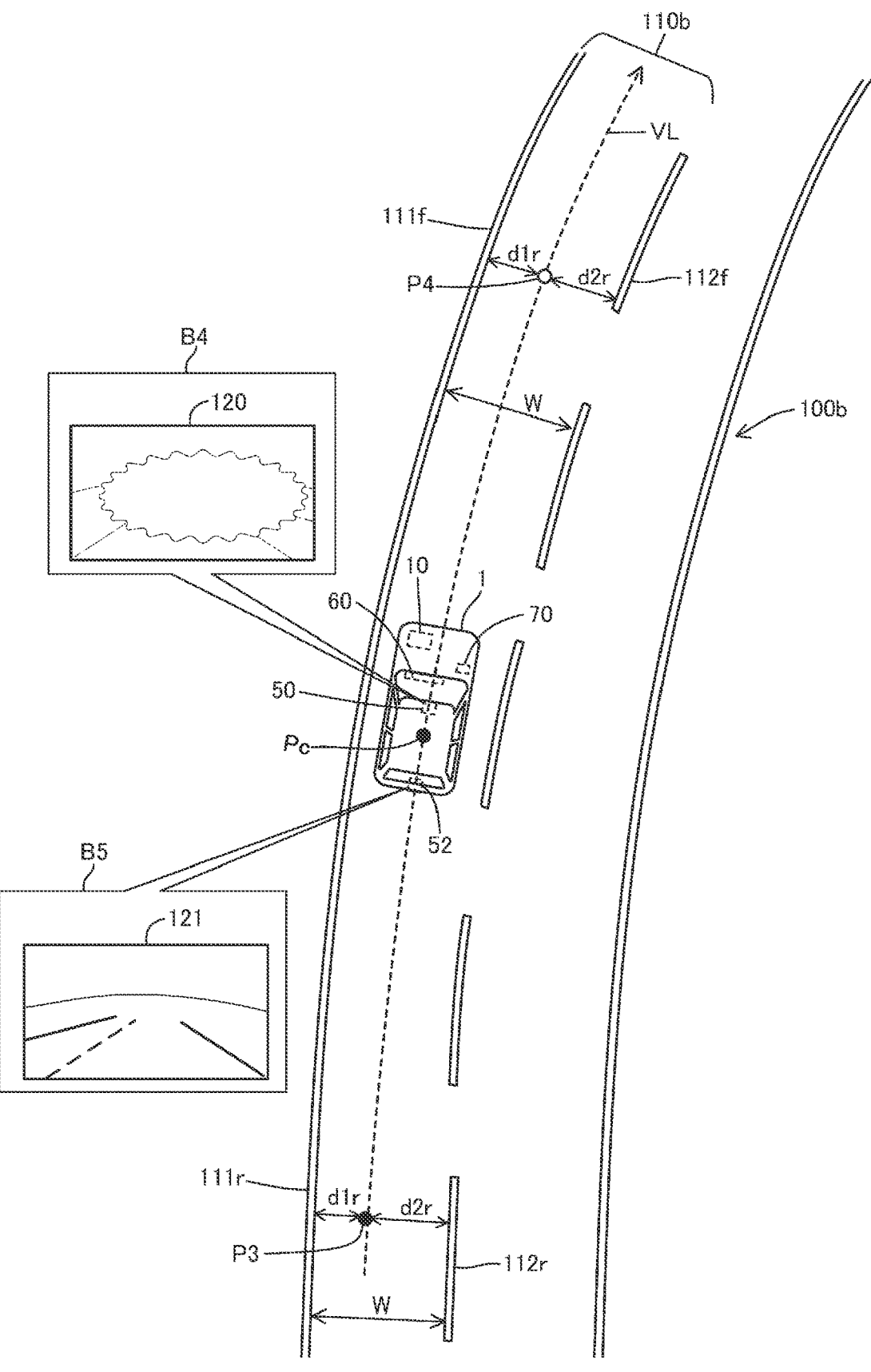
FIG. 4 is an explanatory diagram of a process of recognizing a lane marking of an own lane ahead, based on a rearward image.

Here, FIG. 4 illustrates a situation in which the vehicle 1 is traveling a curved road 100*b*, and it is difficult for the frontward lane edge part recognition unit 22 to recognize the positions of the lane markings 111*f*, 112*f* ahead of the vehicle 1 from the frontward image 120 captured by the front camera 50. In FIG. 4, it is possible for the rearward lane edge part recognition unit 23 to recognize the positions of the lane markings 111*r*, 112*r* behind the vehicle 1 from the rearward image 121 captured by the rear camera 52, and the respective distances d1*r*, d2*r* between the vehicle 1 and the lane markings 111*r*, 112*r* at a position P3 in the width direction W of the road 100*b* are recognized.

Under the situation in FIG. 4, the frontward lane edge part estimation unit 26 recognizes a shape (here, a curved roadway) of the road 100*b* ahead of the vehicle 1, according to the first element and the second element. The frontward lane edge part estimation unit 26 then assumes a virtual line VL with a curvature fitted to the shape of the road 100*b* ahead of the current position Pc of the vehicle 1, by using the distances d1*r*, d2*r* between the vehicle 1 and the lane markings 111*r*, 112*r* behind according to the third element, and estimates a position at the distance d1*r* leftward from the virtual line VL, as the position of the left-side lane marking 111*f*. Similarly, the frontward lane edge part estimation unit 26 estimates a position at the distance d2*r* rightward from the virtual line VL, as the position of the right-side lane marking 112*f*. FIG. 4 illustrates a case in which the positions of the lane markings 111*f*, 112*f* of the own lane 110*b* at a position P4 ahead of the vehicle 1 are estimated.

The lane keeping assist control unit 27 performs lane keeping assist control of causing the steering device 70 to operate in such a manner that the vehicle 1 travels closely along a center of the own lane 110*a*, 110*b*, based on the positions of the lane markings 111*f*, 112*f* ahead of the vehicle 1 recognized by the frontward lane edge part recognition unit 22. In the example in FIG. 3, the lane keeping assist control unit 27 causes the steering device 70 to operate in such a manner as to reduce an amount of deviation Δw in the width direction W between the vehicle 1 and the center c of the own lane 110*a* recognized from the positions of the lane markings 111*f*, 112*f*.

Moreover, when it is difficult for the frontward lane edge part recognition unit 22 to recognize the positions of the lane markings 111*f*, 112*f* but it is possible for the frontward lane edge part estimation unit 26 to estimate the positions of the lane marking 111*f*, 112*f* as shown in FIG. 4, the lane keeping assist control unit 27 performs the lane keeping assist control by using the positions of the lane markings 111*f*, 112*f* estimated by the frontward lane edge part estimation unit 26.

The lane viewing assist control unit 28 performs lane viewing assist control of displaying, on the display device 60, an informing image 61 showing the positions of the lane markings 111*f*, 112*f* ahead of the vehicle 1 recognized by the frontward lane edge part recognition unit 22, or of the lane markings 111*f*, 112*f* ahead of the vehicle 1 estimated by the frontward lane edge part estimation unit 26, as shown in a callout B3 in FIG. 3. The display device 60 is arranged in an instrument panel below a front windshield 90 of the vehicle 1. The informing image 61 may be displayed by superimposing icons of the lane markings 111*f*, 112*f* on an actual image ahead of the vehicle 1 captured by the front camera 50, or may be a 3D-graphic quasi-image.

2. Driving Assistance Process

Figure 5:
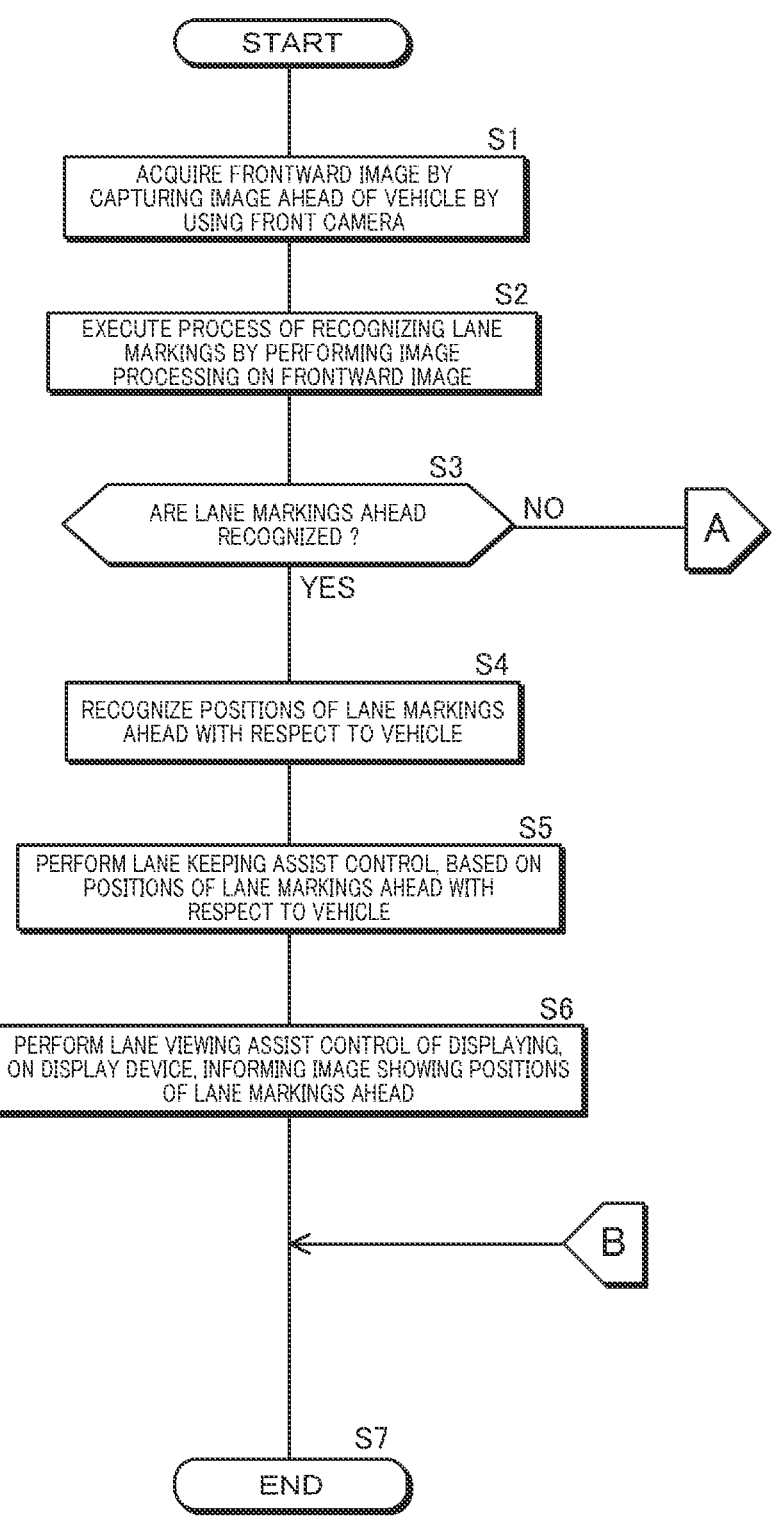
FIG. 5 is a first flowchart of a driving assistance process.
Figure 6:
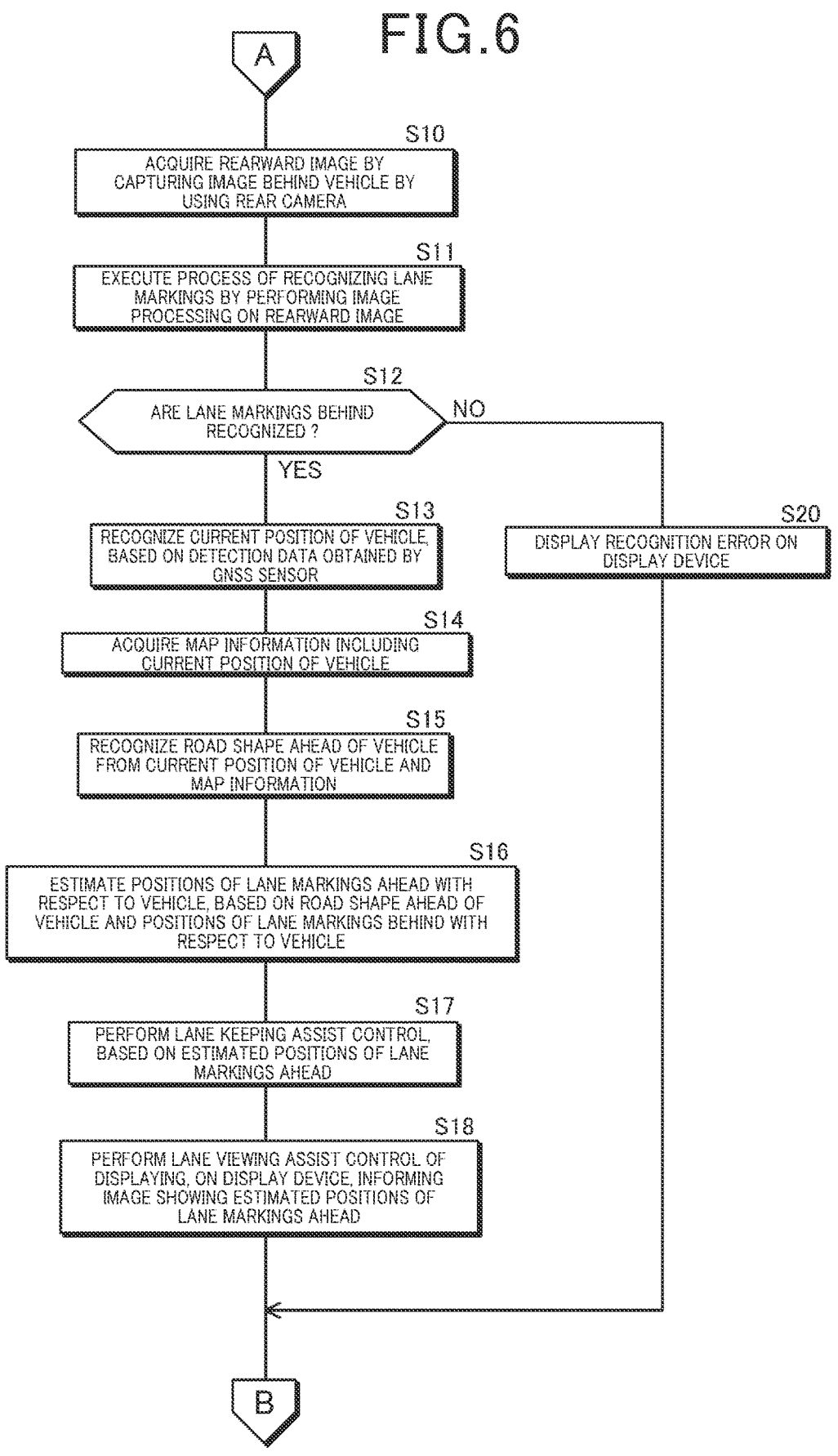
FIG. 6 is a second flowchart of the driving assistance process.

A procedure for a series of driving assistance process executed by the driving assistance system 10 is described by following flowcharts shown in FIGS. 5 and 6. The driving assistance system 10 performs the lane keeping assist control and the lane viewing assist control by repeatedly executing the process according to the flowcharts shown in FIGS. 5 and 6 while the vehicle 1 is traveling.

In step S1 in FIG. 5, the vehicle surroundings image acquisition unit 21 acquires the frontward image 120 by capturing an image ahead of the vehicle 1 by using the front camera 50. In subsequent step S2, the frontward lane edge part recognition unit 22 executes a process of recognizing the lane markings 111*f*, 112*f* of the own lane ahead of the vehicle 1 by performing the image processing on the frontward image 120. In next step S3, the frontward lane edge part recognition unit 22 proceeds the process to step S4 when the lane markings 111*f*, 112*f* are recognized, and proceeds the process to step S10 in FIG. 6 when the lane markings 111*f*, 112*f* are not recognized.

In step S4, the frontward lane edge part recognition unit 22 recognizes the positions of the lane markings 111*f*, 112*f* of the own lane 110*a* ahead with respect to the vehicle 1, based on position detection data from the front camera 50. In subsequent step S5, the lane keeping assist control unit 27, as described above, performs the lane keeping assist control of causing the steering device 70 to operate in such a manner as to reduce the amount of deviation Δw (see FIG. 3) between the vehicle 1 and the center c in the width direction W of the own lane 110*a*.

In next step S6, the lane viewing assist control unit 28, as described above with reference to FIG. 3, performs the lane viewing assist control of displaying, on the display device 60, the informing image 61 showing the positions of the lane markings 111*f*, 112*f* ahead of the vehicle 1 recognized by the frontward lane edge part recognition unit 22. Note that when an object ahead to avoid can be recognized by, for example, the front radar 51 that is another front object detection unit, it is natural that the object ahead may be avoided by switching from the lane viewing assist control to commonly known avoidance control (means) or the like while safety in the surroundings of the own vehicle is confirmed by using an image of the surroundings or the like.

In step S10 in FIG. 6, the vehicle surroundings image acquisition unit 21 acquires the rearward image 121 by capturing an image behind the vehicle 1 by using the rear camera 52. In subsequent step S11, the rearward lane edge part recognition unit 23 executes a process of recognizing the lane markings 111*r*, 112*r* of the own lane behind the vehicle 1 by performing the image processing on the rearward image 121. In next step S12, the rearward lane edge part recognition unit 23 proceeds the process to step S13 when the lane markings 111*r*, 112*r* are recognized, and proceeds the process to step S20 when the lane markings 111*r*, 112*r* are not recognized. In step S20, the rearward lane edge part recognition unit 23 displays an image informing a recognition error on the display device 60 and proceeds the process to step S7 in FIG. 5.

In step S13, the vehicle position recognition unit 24 recognizes the current position Pc of the vehicle 1 based on detection data obtained by the GNSS sensor 81. In subsequent step S14, the map information acquisition unit 25 acquires map information including the current position Pc of the vehicle 1 by referring to the map data 82. In next step S15, the frontward lane edge part estimation unit 26 recognizes a road shape ahead of the vehicle 1 from the current position Pc of the vehicle 1 and the map information. In subsequent step S16, the frontward lane edge part estimation unit 26 estimates the positions of the lane markings 111*f*, 112*f* ahead of the vehicle 1 according to the first to third elements, based on the road shape ahead of the vehicle 1 and the positions of the lane markings 111*r*, 112*r* of the own lane behind with respect to the vehicle 1.

In subsequent step S17, the lane keeping assist control unit 27 performs the lane keeping assist control as in step S5, based on the positions of the lane markings 111*f*, 112*f* ahead estimated by the frontward lane edge part estimation unit 26. In next step S18, the lane viewing assist control unit 28 performs the lane viewing assist control as in step S6, based on the positions of the lane markings 111*f*, 112*f* ahead estimated by the frontward lane edge part estimation unit 26. Note that when an object ahead to avoid can be recognized by, for example, the front radar 51 that is another front object detection unit, it is natural that the object ahead may be avoided by switching from the lane viewing assist control to commonly known avoidance control (means) or the like while safety in the surroundings of the own vehicle is confirmed by using an image of the surroundings or the like.

3. Other Embodiments

Although the embodiment illustrates the lane markings 111*f*, 112*f*, 111*r*, 112*r* as lane edge parts of the present disclosure, a lane edge part may be a curb, a road stud, or the like.

Although the driving assistance system 10 includes the lane keeping assist control unit 27 and the lane viewing assist control unit 28 to perform the lane keeping assist control and the lane viewing assist control in the embodiment, a configuration may be made that includes only any one of the lane keeping assist control unit 27 and the lane viewing assist control unit 28. A process other than the lane keeping assist control and the lane viewing assist control may be performed by using the lane markings 111*f*, 112*f* ahead of the vehicle 1 estimated by the frontward lane edge part estimation unit 26.

Although the driving assistance system 10 is included in the vehicle 1 in the embodiment, one or some, or all, of the components of the driving assistance system 10 may be included in the driving assistance server 220. For example, when all of the components of the driving assistance system 10 are included in the driving assistance server 220, the frontward image 120 captured by the front camera 50 and the rearward image 121 captured by the rear camera 52 are transmitted from an ECU (Electronic Control Unit) of the vehicle 1 to the driving assistance server 220, whereby the driving assistance system 10 acquires the frontward image 120 and the rearward image 121. At the driving assistance server 220, the process according to the flowcharts of FIGS. 5 to 6 is executed, and control instruction data to the steering device 70 for steering through the lane keeping assist control and control instruction data to the display device 60 for image display through the lane viewing assist control are transmitted from the driving assistance server 220 to the ECU of the vehicle 1. Thus, a configuration is made that controls operation of the steering device 70 and the display device 60 in the vehicle 1.

Note that FIG. 2 is a schematic diagram showing the configuration of the driving assistance system 10 that is segmented based on the main processes in order to facilitate the understanding of the invention of the present application, and the configuration of the driving assistance system 10 may be segmented based on other classification. Moreover, the process by each constituent element may be executed by a single hardware unit, or may be executed by a plurality of hardware units. The process by each constituent element shown in FIGS. 5 to 6 may be executed based on a single program, or may be executed based on a plurality of programs.

4. Configurations Supported by the Embodiment

The embodiment is a specific example of configurations described below.

(Configuration 1) A driving assistance system including: a vehicle surroundings image acquisition unit that acquires a frontward image ahead of and a rearward image behind a vehicle, each of the frontward image and the rearward image being captured by a camera included in the vehicle; a frontward lane edge part recognition unit that, based on the frontward image, recognizes a position, with respect to the vehicle, of a lane edge part of an own lane ahead of the vehicle, the own lane being a lane in which the vehicle is traveling; a rearward lane edge part recognition unit that, based on the rearward image, recognizes a position, with respect to the vehicle, of a lane edge part of the own lane behind the vehicle; a vehicle position recognition unit that recognizes a current position of the vehicle; a map information acquisition unit that acquires map information including information on a target road on which the vehicle is traveling; and a frontward lane edge part estimation unit that, when it is difficult for the frontward lane edge part recognition unit to recognize the position, with respect to the vehicle, of the lane edge part of the own lane ahead of the vehicle, estimates the position, with respect to the vehicle, of the lane edge part of the own lane ahead of the vehicle, based on a shape of the target road ahead of the vehicle, and based on the position, with respect to the vehicle, of the lane edge part of the own lane behind the vehicle recognized by the rearward lane edge part recognition unit, the shape of the target road being recognized from the map information and the current position of the vehicle.

According to the driving assistance system in configuration 1, in a situation where it is difficult to recognize the lane edge part ahead of the vehicle, vehicle driving assistance can be performed by estimating the position, with respect to the vehicle, of the lane edge part of the own lane ahead of the vehicle, based on the position, with respect to the vehicle, of the lane edge part of the own lane behind the vehicle recognized by the rearward lane edge part recognition unit.

(Configuration 2) The driving assistance system according to configuration 1, further including a lane keeping assist control unit that causes a steering device included in the vehicle to operate in such a manner that the vehicle travels on a center part in width direction of the own lane, based on the position, with respect to the vehicle, of the lane edge part of the own lane ahead of the vehicle recognized by the frontward lane edge part recognition unit, or based on the position, with respect to the vehicle, of the lane edge part of the own lane ahead of the vehicle estimated by the frontward lane edge part estimation unit.

According to the driving assistance system in configuration 2, even if it is difficult to recognize the lane edge part ahead of the vehicle, the lane keeping assist control unit can perform control of causing the steering device of the vehicle to operate in such a manner that the vehicle travels on the center part in the width direction of the own lane.

(Configuration 3) The driving assistance system according to configuration 1 or 2, further including a lane viewing assist control unit that causes a display device included in the vehicle to display an informing image showing the position of the lane edge part of the own lane ahead of the vehicle, based on the position, with respect to the vehicle, of the lane edge part of the own lane ahead of the vehicle recognized by the frontward lane edge part recognition unit, or based on the position, with respect to the vehicle, of the lane edge part of the own lane ahead of the vehicle estimated by the frontward lane edge part estimation unit.

According to the driving assistance system in configuration 3, even if it is difficult to recognize the lane edge part ahead of the vehicle, the lane viewing assist control unit can cause the display device of the vehicle to display the informing image showing the position of the lane edge part of the own lane ahead of the vehicle.

(Configuration 4) A driving assistance method executed by a computer, the driving assistance method including: a vehicle surroundings image acquisition step of acquiring a frontward image ahead of and a rearward image behind a vehicle, each of the frontward image and the rearward image being captured by a camera included in the vehicle; a frontward lane edge part recognition step of, based on the frontward image, recognizing a position, with respect to the vehicle, of a lane edge part of an own lane ahead of the vehicle, the own lane being a lane in which the vehicle is traveling; a rearward lane edge part recognition step of, based on the rearward image, recognizing a position, with respect to the vehicle, of a lane edge part of the own lane behind the vehicle; a vehicle position recognition step of recognizing a current position of the vehicle; a map information acquisition step of acquiring map information including information on a target road on which the vehicle is traveling; and a frontward lane edge part estimation step of, when it is difficult in the frontward lane edge part recognition step to recognize the position, with respect to the vehicle, of the lane edge part of the own lane ahead of the vehicle, estimating the position, with respect to the vehicle, of the lane edge part of the own lane ahead of the vehicle, based on a shape of the target road ahead of the vehicle, and based on the position, with respect to the vehicle, of the lane edge part of the own lane behind the vehicle recognized in the rearward lane edge part recognition step, the shape of the target road being recognized from the map information and the current position of the vehicle.

By a computer executing the driving assistance method according to configuration 4, similar operation and effects to those of the driving assistance system according to configuration 1 can be obtained.

(Configuration 5) A non-transitory recording medium storing a program that causes a computer to function as: a vehicle surroundings image acquisition unit that acquires a frontward image ahead of and a rearward image behind a vehicle, each of the frontward image and the rearward image being captured by a camera included in the vehicle; a frontward lane edge part recognition unit that, based on the frontward image, recognizes a position, with respect to the vehicle, of a lane edge part of an own lane ahead of the vehicle, the own lane being a lane in which the vehicle is traveling; a rearward lane edge part recognition unit that, based on the rearward image, recognizes a position, with respect to the vehicle, of a lane edge part of the own lane behind the vehicle; a vehicle position recognition unit that recognizes a current position of the vehicle; a map information acquisition unit that acquires map information including information on a target road on which the vehicle is traveling; and a frontward lane edge part estimation unit that, when it is difficult for the frontward lane edge part recognition unit to recognize the position, with respect to the vehicle, of the lane edge part of the own lane ahead of the vehicle, estimates the position, with respect to the vehicle, of the lane edge part of the own lane ahead of the vehicle, based on a shape of the target road ahead of the vehicle, and based on the position, with respect to the vehicle, of the lane edge part of the own lane behind the vehicle recognized by the rearward lane edge part recognition unit, the shape of the target road being recognized from the map information and the current position of the vehicle.

By a computer executing the program according to configuration 5, the configuration of the driving assistance system according to configuration 1 can be implemented.

REFERENCE SIGNS LIST 1 vehicle, 10 driving assistance system, 20 processor, 21 vehicle surroundings image acquisition unit, 22 frontward lane edge part recognition unit, 23 rearward lane edge part recognition unit, 24 vehicle position recognition unit, 25 map information acquisition unit, 26 frontward lane edge part estimation unit, 27 lane keeping assist control unit, 28 lane viewing assist control unit, 30 memory, 31 program, 40 communication unit, 50 front camera, 51 front radar, 52 rear camera, 53 rear radar, 60 display device, 61 informing image, 70 steering device, 80 navigation device, 81 GNSS sensor, 82 map data, 100a, 100b road, 110a, 110b own lane, 111f, 112f lane markings ahead, 111r, 112r lane markings behind, 120 frontward image, 121 rearward image

What is claimed is:

1. A driving assistance system comprising a processor, wherein the processor is configured to:

acquire a frontward image ahead of a vehicle using at least a front camera and a rearward image behind the vehicle using at least a rear camera;

recognize a position of at least one lane edge part of an own lane ahead of the vehicle by extracting an image part of a lane marking of the own lane ahead of the vehicle from the frontward image;

recognize a position of at least one lane edge part of the own lane behind the vehicle by extracting an image part of a lane marking of the own lane behind the vehicle from the rearward image;

recognize a current position of the vehicle based on position detection data from a GNSS (Global Navigation Satellite System) sensor;

acquire map information including information on a shape of a target road on which the vehicle is traveling;

when the image part of the lane marking of the own lane ahead of the vehicle cannot be extracted from the frontward image, assume a virtual line with a curvature fitted to the shape of the target road based on the current position of the vehicle, the map information including the shape of the target road on which the vehicle is traveling, and a distance between the position of the at least one lane edge part of the own lane behind the vehicle and the vehicle, and estimate positions at the distance leftward and rightward from the virtual line as positions of each lane edge part of the own lane ahead of the vehicle; and cause a steering device included in the vehicle to operate such that the vehicle travels along a center part of the own lane with respect to a in width direction of the own lane, based on the recognized position of the at least one lane edge part of the own lane ahead of the vehicle, or based on the estimated positions of each lane edge part of the own lane ahead of the vehicle.

2. The driving assistance system according to claim 1, wherein the processor is further configured to cause a display device included in the vehicle to display an informing image showing the position of the at least one lane edge part of the own lane ahead of the vehicle, based on the recognized position of the at least one lane edge part of the own lane ahead of the vehicle, or based on the estimated positions of each lane edge part of the own lane ahead of the vehicle.

3. A driving assistance method executed by a computer, the driving assistance method comprising:

a vehicle surroundings image acquisition step of acquiring a frontward image ahead of a vehicle using at least a front camera and a rearward image behind the vehicle using at least a rear camera;

a frontward lane edge part recognition step of recognizing a position of at least one lane edge part of an own lane ahead of the vehicle by extracting an image part of a lane marking of the own lane ahead of the vehicle from the frontward image;

a rearward lane edge part recognition step of recognizing a position of at least one lane edge part of the own lane behind the vehicle by extracting an image part of a lane marking of the own lane behind the vehicle from the rearward image;

a vehicle position recognition step of recognizing a current position of the vehicle based on position detection data from a GNSS (Global Navigation Satellite System) sensor;

a map information acquisition step of acquiring map information including information on a shape of a target road on which the vehicle is traveling;

a frontward lane edge part estimation step of, when the image part of the lane marking of the own lane ahead of the vehicle cannot be extracted from the frontward image, assuming a virtual line with a curvature fitted to the shape of the target road by using the current position of the vehicle, the map information including the shape of the target road on which the vehicle is traveling, and a distance between the position of the at least one lane edge part of the own lane behind the vehicle recognized in the rearward lane edge part recognition step and the vehicle, and estimating positions at the distance leftward and rightward from the virtual line as positions of each lane edge part of the own lane ahead of the vehicle; and a lane keeping assist control step of causing a steering device included in the vehicle to operate such that the vehicle travels along a center part of the own lane with respect to a in width direction of the own lane, based on the position of the at least one lane edge part of the own lane ahead of the vehicle recognized in the frontward lane edge part recognition step, or based on the positions of each lane edge part of the own lane ahead of the vehicle estimated in the frontward lane edge part estimation step.

4. A non-transitory recording medium storing a program that causes a computer to function as:

a vehicle surroundings image acquisition unit that acquires a frontward image ahead of a vehicle using at least a front camera and a rearward image behind the vehicle using at least a rear camera;

a frontward lane edge part recognition unit that recognizes a position of at least one lane edge part of an own lane ahead of the vehicle by extracting an image part of a lane marking of the own lane ahead of the vehicle from the frontward image;

a rearward lane edge part recognition unit that recognizes a position of at least one lane edge part of the own lane behind the vehicle by extracting an image part of a lane marking of the own lane behind the vehicle from the rearward image;

a vehicle position recognition unit that recognizes a current position of the vehicle based on position detection data from a GNSS (Global Navigation Satellite System) sensor;

a map information acquisition unit that acquires map information including information on a shape of a target road on which the vehicle is traveling; and a frontward lane edge part estimation unit that, when the image part of the lane marking of the own lane ahead of the vehicle cannot be extracted from the frontward image, assumes a virtual line with a curvature fitted to the shape of the target road by using the current position of the vehicle, the map information including the shape of the target road on which the vehicle is traveling, and a distance between the position of the at least one lane edge part of the own lane behind the vehicle recognized by the rearward lane edge part recognition unit and the vehicle, and estimates positions at the distance leftward and rightward from the virtual line as positions of each lane edge part of the own lane ahead of the vehicle; and a lane keeping assist control unit that causes a steering device included in the vehicle to operate such that the vehicle travels along a center part of the own lane with respect to a width direction of the own lane, based on the position of the at least one lane edge part of the own lane ahead of the vehicle recognized by the frontward lane edge part recognition unit, or based on the positions of each lane edge part of the own lane ahead of the vehicle estimated by the frontward lane edge part estimation unit.

* * * * *